United States Patent [19]

Butler et al.

[11] Patent Number: 5,766,323
[45] Date of Patent: Jun. 16, 1998

[54] CEMENTITIOUS MATERIALS

[75] Inventors: Derek William Butler; David Randall Thomas. both of Barry. United Kingdom

[73] Assignee: Dow Corning, Ltd., Barry. Wales

[21] Appl. No.: 865,543

[22] Filed: May 29, 1997

[30] Foreign Application Priority Data

Jun. 6, 1996 [GB] United Kingdom .................. 9611776

[51] Int. Cl.$^6$ ..................................................... C04B 24/42
[52] U.S. Cl. ............... 106/2; 106/696; 106/724; 106/806; 106/823
[58] Field of Search ............... 106/2, 696, 724, 106/806, 823

[56] References Cited

U.S. PATENT DOCUMENTS

| | | | |
|---|---|---|---|
| 4,129,447 | 12/1978 | Roth et al. | 106/2 |
| 4,209,432 | 6/1980 | Roth. | |
| 4,231,917 | 11/1980 | Zeldin et al. | |
| 4,394,335 | 7/1983 | Roth et al. | 106/795 |
| 4,704,416 | 11/1987 | Eck et al. | 524/17 |
| 5,091,002 | 2/1992 | Schamberg et al. | 106/2 |
| 5,196,054 | 3/1993 | Schmuck et al. | 106/2 |
| 5,518,541 | 5/1996 | Fogel et al. | 106/806 |
| 5,595,597 | 1/1997 | Fogel et al. | 106/806 |
| 5,618,627 | 4/1997 | Merrifield et al. | 427/387 |

FOREIGN PATENT DOCUMENTS

| | | | |
|---|---|---|---|
| 3101754 | 7/1982 | Germany | 106/806 |
| 0085452 | 6/1980 | Japan | 106/806 |
| 0061657 | 4/1982 | Japan | 106/806 |
| 402160651 | 6/1990 | Japan. | |
| 403257054 | 11/1991 | Japan. | |
| 405032442 | 2/1993 | Japan. | |
| 405319882 | 12/1993 | Japan. | |
| 405330880 | 12/1993 | Japan. | |
| 405330881 | 12/1993 | Japan. | |
| 406122539 | 5/1994 | Japan. | |
| 0808432 | 2/1981 | U.S.S.R. | 106/806 |
| 0816994 | 3/1981 | U.S.S.R. | 106/806 |
| 001194834 | 6/1970 | United Kingdom | 106/806 |

*Primary Examiner*—Paul Marcantoni
*Attorney, Agent, or Firm*—James L. DeCesare

[57] ABSTRACT

A cementitious material in powder form comprising cement. also comprises sufficient of a granulated hydrophobing additive. which comprises from 5 to 15 parts by weight of an organopolysiloxane component. from 10 to 40 parts by weight of a water-soluble or water-dispersible binder and from 50 to 80 parts by weight of a carrier particle. to give from 0.01 to 5% by weight of the organosiloxane component based on the weight of the cement. The cementitious material displays good hydrophobicity. which may improve upon subsequent wettings of the applied cementitious material to a substrate.

14 Claims, No Drawings

CEMENTITIOUS MATERIALS

The present invention relates to cementitious materials which exhibit a hydrophobic character. The invention also relates to a process for making cementitious materials hydrophobic.

It has long been desirable to ensure that cementitious materials, e.g. those which have been applied to a substrate, such as an external wall, are at least to some extent hydrophobic. A number of solutions have been suggested in the past including the post-treatment of the applied cementitious material and the addition of hydrophobing additives to the cementitious materials prior to their application to a substrate. In the most common situations hydrophobing additives are added immediately prior to or at the stage itself of applying the cementitious material to a substrate. It is, however, preferred to provide a cementitious material which has incorporated therein a hydrophobing agent or additive prior to application to a substrate, even more preferably at the stage where the cementitious material is in a dry, powdery form.

The prior art has disclosed in a number of patent specifications a method in which such additives can be added to cementitious material. However, these additives are usually added at the time that the cementitious material has been wetted immediately prior to the application of the cementitious material to a substrate. One possible reason for this approach lies in the fact that the additive is often not readily miscible with the cementitious material in a dry state, or, even where it is miscible, it is not storage stable when mixed with dry cementitious material under normal storage conditions.

British patent specification 2 043 047 for example discloses a method of manufacturing steam-cured lightweight aerated concrete having hydrophobic properties which comprises preparing an aqueous expandable and solidifiable slurry to which is added, immediately or shortly prior to casting said slurry, a silicone oil in certain quantities. It is preferred that the silicone oil is provided as an aqueous emulsion. A similar approach is used in European patent specification 053223 in which hydro-thermally hardened waterproof structural bricks are prepared from hydraulic binders, water and additives which comprise an organopolysiloxane preferably added as an aqueous emulsion immediately prior to the shaping and steam curing stages of the production.

Another development has been disclosed in European patent specification 228657 in which a water redispersible powder composition is disclosed which contains a water-soluble polymer and at least 30% by weight of an organic silicone compound. This water dispersible powder composition is manufactured by spray-drying using an emulsion or a suspension of the composition. The water dispersible powders are said to be useful as additives e.g. for plasters, hydraulic binders such as cement, clay or pigment and in water diluted form for rendering bulk materials water repellent. It is stated in the specification that the silicone containing water redispersible powder can be mixed in dry form with other powders before being sent to the end user. One of the applications of these water dispersible powders is for rendering a material hydrophobic.

Although the prior art has provided useful ways of rendering cementitious or other materials hydrophobic there is always a desire for further improvements in this area. We have now found that if silicone-containing additives are made in a specific way, i.e. by granulation, an improvement in hydrophobicity can be imparted to cementitious materials.

According to a first aspect of the invention, there is provided a cementitious material in powder form comprising cement and sufficient of a granulated hydrophobing additive, which comprises from 5 to 15 parts by weight of an organopolysiloxane component, from 10 to 40 parts by weight of a water-soluble or water-dispersible binder and from 50 to 80 parts by weight of a carrier particle, to give from 0.01 to 5% by weight of the organosiloxane component based on the weight of the cement.

The organopolysiloxane component which may be used as ingredient for the granulated hydrophobing additive may be chosen from any of the known organopolysiloxane materials, i.e. materials which are based on a Si—O—Si polymer chain and which may comprise mono-functional, di-functional, tri-functional and/or tetra-functional siloxane units, many of which are commercially available. It is preferred that the majority of siloxane units are di-functional materials having the general formula $R_2SiO_{2/2}$, wherein each R independently denotes an organic component or a hydroxyl or halogen substituent. Preferably R will be selected from hydroxyl groups, alkyl groups, alkenyl groups, aryl groups, alkyl-aryl groups, aryl-alkyl groups, alkoxy groups or aryloxy groups. More preferably a substantial part, most preferably at least 80% of the R substituents will be alkyl groups having from 1 to 12 carbon atoms most preferably methyl or ethyl groups.

Although it is preferred that the majority of siloxane units are di-functional siloxane units other units such as tri-functional or tetra-functional units may also be present which would cause the polymer chain to exhibit a certain amount of branching. Although resinous siloxane materials would also be possible, it is preferred that the tri-functional or tetra-functional siloxane units should not exceed 10% of the total number of units thereby limiting the amount of branching that is taking place at the polymer level. More preferably no more than about 1 siloxane units causing branching should be present in the polymer. In addition to the potential branching units there will also be present a number of mono-functional siloxane units. These will be used as end-capping or end-blocking units for the polymer and have preferably the formula —$O_{1/2}SiR_3$ wherein R is as defined above, but preferably being a $C_{1-6}$ alkyl group, most preferably methyl or ethyl.

The total number of siloxane units is preferably such that the organopolysiloxane material has a viscosity of from 50 to a maximum of about 60.000 mm²/s at 25° C. More preferably the viscosity of the siloxane should not exceed about 5.000 mm²/s at 25° C. The more preferred organopolysiloxane materials have the general formula $$RR'_2Si—O—[R'_2SiO]_a—[R''R'SiO]_b—[R''_2SiO]_c—R'_2R \quad (I)$$

wherein R is as defined above, R' denotes a hydrocarbon group or substituted hydrocarbon group, e.g. amino or epoxy-substituted hydrocarbon group, R" is an organopolysiloxane chain of the formula O—[R'$_2$SiO]$_x$—SiR'$_2$R, a is an integer, b, c and x are zero or integers whereby b+c are no more than 5% of the total of a+b+c+x. Most preferably at least 80% of all R' groups are alkyl groups having from 1 to 6 carbon atoms, e.g. methyl, ethyl or isopropyl.

The second essential ingredient of the granulated hydrophobing additive is a water-soluble or water-dispersible binder material. Such materials are known in the literature and have been described in a number of publications. They are preferably materials which at room temperature, i.e. from 20° to 25° C., have a waxy, highly viscous or solid consistency and have a melting point of from 25° to 1500° C. Examples of suitable water-soluble or water-dispersible binder materials include polyvinyl alcohols, methyl cellulose, carboxy methyl cellulose, polyoxyethylene waxes and other film forming polymers. It is preferred that the binder material is actually water soluble. Most preferably its water solubility should be such that it does not interfere with the hydration process of the cementitious material when water is added to that prior to its application or use.

The third essential ingredient of the granulated hydrophobing additive is a carrier particle. Carrier particles may be water-soluble, water-insoluble or water-dispersible. Suitable examples of carrier particles include starch, native starch, methyl cellulose, carboxy methyl cellulose, cement, sand, silica, fly ash, alumino silicates, clay materials, lime, calcium carbonates, polystyrene beads and polyacrylate beads. It is preferred that the carrier particles have a diameter of from 10 to 5000 μm, more preferably 15 to 100 μm, most preferably 20 to 100 μm. Although on the one hand it is preferred to use materials which fulfil a useful role in cementitious compositions per se, it has been found that water-soluble carrier particles have particularly interesting effects, even if they are not per se active materials in cementitious compositions.

It is preferred that the granulated hydrophobing additive comprises from 5 to 15%, more preferably 10 to 15% by weight of the organopolysiloxane component, from 10 to 40%, more preferably 15 to 30% by weight of the binder and from 50 to 80%, more preferably 55 to 75% by weight of the carrier. It is also preferred that the organopolysiloxane and binder components together comprise from 20 to 45% by weight of the total weight of the hydrophobing additive. It is also preferred that the weight ratio of carrier particles to the combined weight of binder and organopolysiloxane components is the range from 3/2 to 9/1, more preferably 7/3 to 4/1 and that the weight ratio of binder component to organopolysiloxane component is greater than 1/1 more preferably having a range of up to 4/1, most preferably from 2/1 to 3/1.

Although it is preferred that the granulated hydrophobing additives consist only of the organopolysiloxane, binder and carrier components, additional ingredients may be included also. Optional additional ingredients may include organic hydrophobing agents, viscosity modifiers, surfactants, pigments, colorants, preservatives, gelling agents, pH modifiers, buffers, accelerators, retarders, air entrainers and fillers, e.g. silica and titanium dioxide. It is however preferred that the optional ingredients do not comprise more than 5 by weight of the total weight of the additive.

The amount of granulated hydrophobing additive which is present in the cementitious materials according to the invention is such that from 0.01 to 5% by weight of the organopolysiloxane component is present based on the cement. More preferably the amount of organopolysiloxane material which is present is from 0.01 to 2% by weight, most preferably 0.05 to 0.5% by weight based on the amount of cement present. For the preferred hydrophobing additives, this means that the additive is present in amounts from 0.06 to 40% by weight of the amount of cement, or from 0.025 to 16% by weight based on the sand/cement mixture where the sand/cement weight ratio is 1.5/1.

It is essential that the hydrophobing additive is granulated, which means that it has been prepared by a granulation process. In a granulation process the organopolysiloxane component and the water-soluble or water-dispersible binder are deposited in their liquid form onto carrier particles thus forming a free flowing solid powder. The granulation method has been described in a number of patent specifications, including EP 496510 and is further detailed below.

The granulating process by which the hydrophobing additives are produced comprises the steps of where necessary heating the organopolysiloxane component and/or the binder to give a liquid material, either separately or in admixture, e.g. as a flowable slurry, which is then deposited onto the carrier particles, e.g. in a fluid bed, thus causing the organopolysiloxane component and binder in admixture to solidify, e.g. through cooling or through the evaporation of a solvent, onto the carrier particles and form a free flowing powder. Methods of granulating such additives have been described in a number of publications, e.g. GB 1407997, EP 0210721 and EP 0496510. The granulated hydrophobing additive may then be mixed in with the cementitious powder material and would form a stable dry composition which may easily be stored or transported in that form.

The granulation process ensures that the organopolysiloxane and the binder material are contacted in their liquid phase and a mixture of the organopolysiloxane and the binder are deposited onto the carrier. It is possible to prepare a mixture of the binder and organopolysiloxane components beforehand, e.g. by mere mixing of the materials or by causing them to be admixed in the presence of adjuvants such as stabilising agents or solvents. However, for the present invention, the formation or use of an aqueous mixture or emulsion in the formation of the granulated additive is not included in a granulation process, as it seems to reduce the efficiency of the hydrophobing in the final application. Conventional procedures for making powders are particularly convenient e.g. granulation and fluid bed coating procedures, both being comprised in the definition of granulation as used herein. For example the binder material in liquid form (e.g. achieved through heating of the material where necessary), and the organopolysiloxane in liquid form (where needed by admixture with small amounts of solvent), may be passed into a tower and permitted to form the hydrophobing additive by depositing the carrier particles, e.g. native starch onto a mixture of said organopolysiloxane material and said binder material.

In one method the organopolysiloxane material and the binder material are sprayed simultaneously onto a fluidised bed. Upon spraying small liquid droplets are formed containing the organopolysiloxane and the binder material. The droplets are usually heated, as the binder material is to be in liquid form. The droplets then cool down as they make their way onto the bed. Thus they solidify, forming a particulate finely divided hydrophobing additive which is then deposited onto the carrier particle. The organopolysiloxane component and the binder component may be mixed prior to spraying, or by contacting the sprayed liquid droplets of both materials, for example by spraying the materials via separate nozzles. Solidification of the droplets which then contain both materials in liquid form, may be encouraged, for example by use of a cool air counter stream, thus reducing more quickly the temperature of the droplets. Alternatively solidification may be encouraged by the use of air counter current to aid evaporation of any solvent present. Other ways of encouraging solidification will be clear to the person skilled in the art. Total solidification does preferably not take place prior to the mixture being deposited onto the carrier particle. The finely divided granulated hydrophobing additive is then collected at the bottom of the tower.

In another method the organopolysiloxane material and binder material are sprayed simultaneously into a drum mixer containing the carrier. On spraying small liquid droplets are formed containing the organopolysiloxane material and the binder material. The droplets partially cool down on contact with the carrier particles. After mixing is complete the partially cooled particles are transferred to a fluidised bed where cooling is completed with ambient air. The finely divided particles of granulated hydrophobing additive are then collected directly from the fluidised bed. Optionally the particles may be further screened by sieving to produce particles of hydrophobing additive substantially free of any undersized or oversized material. A typical apparatus which is useful for the method of the invention is the Eirich® pan granulator, the Schugi® mixer, the Paxeson-Kelly® twin-core blender, the Lödige® ploughshare mixer or one of the numerous types of fluidised bed apparatuses, e.g. Aeromatic® fluidised bed granulator.

In a second aspect of the invention, there is provided a process of imparting to cementitious material a hydrophobing character by mixing into the cementitious material a hydrophobing additive as described above. Mixing may be done by mechanical means or any other appropriate method known in the art.

It was surprising to find that cementitious material according to the first aspect of the invention exhibit mostly a greater hydrophobing efficiency than those found in the prior art materials, even sometimes when the addition level of the hydrophobing additive is lower than that of the prior art.

Even more surprising, it was found that in most cases the hydrophobic nature of the cementitious material when applied to a substrate after having been mixed with water increased upon subsequent wettings of the applied cementitious material, particularly when the binder material and the carrier material are both water-soluble materials. This is particularly advantageous as the industry prefers to have a material which is fairly hydrophilic during application which causes it to be more easily mixed in with the water before application and to develop a hydrophobic characteristic with time. This would improve the process here e.g. coating of additional layers of cementitious materials upon a previously applied layer is desirable, for example in the case of rendering cement.

Cementitious material according to the first aspect of the invention may also comprise additional ingredients. These additional ingredients may include sand, filler and other materials traditionally found in cementitious materials, e.g. lime, aggregate, accelerators, air entrainers, retarders and pozzolanic materials.

There now follows a number of examples which illustrate the invention. All parts and percentages are given by weight unless otherwise indicated.

EXAMPLES 1-11

Preparation of Granulated Hydrophobing Additive 60 parts of an water-soluble or water-dispersible wax A were melted in a beaker at a temperature of 750° C. With stirring was added 40 parts of a polydimethyl siloxane B until the mixture was homogeneous. This mixture was then poured over 150 parts of a carrier C and mixed until a free flowing powder was obtained having a polydimethyl siloxane content of 12% by weight. Wax A was selected from Emulan® OFA, which is believed to be a 80/20 mixture of an ethoxylate wax and a carboxylic acid, at a ratio 2/3 (Wax A1), Lutensol® at 80, which is an ethoxylate wax (Wax A2) and a polyethylene glycol having a molecular weight of about 4000 (Wax A3). Polydimethylsiloxane B was selected from trimethyl siloxane end-blocked polydimethyl siloxane having a viscosity at 25° C. of about 350 mm²/s (Siloxane B1), a trimethylsiloxane end-blocked polydimethylsiloxane having a viscosity of about 5000 mm²/s at 25° C. (Siloxane B2), a branched polydimethyl siloxane having a viscosity at 25° C. of about 20,000 mm²/s (Siloxane B3) and a silanol end-blocked polydimethylsiloxane having a viscosity of about 100 mm²/s at 25° C. (Siloxane B4). Carrier C was selected from a zeolite sold as Wessalith® P (Carrier C1), native maize starch (Carrier C2), calcium carbonate (Carrier C3), sand (Carrier C4), Portland cement (Carrier 5) and calcium carbonate (Carrier C6). Details are giving in Table 1 below:

TABLE 1

| Example additive | Wax | Siloxane | Carrier |
| --- | --- | --- | --- |
| 1 | A1 | B1 | C1 |
| 2 | A1 | B3 | C2 |
| 3 | A1 | B3 | C2 |
| 4 | A1 | B1 | C3 |
| 5 | A1 | B1 | C4 |
| 6 | A1 | B1 | C5 |
| 7 | A1 | B4 | C6 |
| 8 | A2 | B1 | C6 |
| 9 | A3 | B1 | C6 |
| 10 | A1 | B2 | C6 |
| 11 | A1 | B4 | C6 |

Preparation of the Cementitious Materials

A mixture of sand and cement in a weight ratio of 1.5/1 was mixed with water and sufficient of the powder additive obtained to give a polydimethyl siloxane level as indicated in Table 2 (ranging from 0.1 to 2% by weight based on the weight of the cement). The ratio of water over cement was 0.68:1 by weight. This mixture was then moulded to a number of test pieces measuring 100×100×25 mm. When the test pieces were removed from the mould after 24 hours in the mould, they were allowed to set for a further period from 7 to 31 days at room temperature under atmospheric conditions, after which they were tested as indicated below.

Comparative Examples 1-4

Blocks of cementitious materials were prepared as described changes as follows:

1. for Comparative Example 1 (C1), no hydrophobing additive was incorporated in the block.
2. for Comparative Example 2 (C2), only the calcium hydroxide carrier of hydrophobing additive of Example 10 was included at the same level as for the blocks made with Example 10 additive.
3. for Comparative Example 3 (C3), an aqueous emulsion of 35% of a trimethylsiloxane end-blocked polydimethylsiloxane having a viscosity at 25° C. of 350 mm²/s was added to the sand/cement mixture to give from 0.1 to 0.3% by weight of siloxane based on the weight of cement, by merely mixing the emulsion in with the mixture of sand and cement.
4. for Comparative Example 4 (C4), a hydrophobing additive was used according to Example 2 above, except that instead of the water soluble wax, stearyl alcohol was used, which is water insoluble.

Testing of the Example materials

For all examples and comparative examples, the amount of polydimethylsiloxane is given in Table 2 below as a percent by weight based on the weight of the cement for each test block produced.

TABLE 2

| TEST BLOCK | EXAMPLE ADDITIVE | % SILOXANE |
| --- | --- | --- |
| 1 | 1 | 0.5 |
| 2 | 2 | 0.1 |
| 3 | 2 | 0.25 |
| 4 | 2 | 0.5 |
| 5 | 2 | 1 |
| 6 | 2 | 2 |
| 7 | 3 | 0.5 |
| 8 | 4 | 0.5 |
| 9 | 5 | 0.5 |

TABLE 2-continued

| TEST BLOCK | EXAMPLE ADDITIVE | % SILOXANE |
|---|---|---|
| 10 | 6 | 0.5 |
| 11 | 7 | 0.5 |
| 12 | 8 | 0.5 |
| 13 | 9 | 0.5 |
| 14 | 10 | 0.5 |
| 15 | 11 | 0.125 |
| 16 | 11 | 0.25 |
| 17 | 11 | 0.5 |
| 18 | 11 | 0.75 |
| 19 | 11 | 0.875 |
| 20 | 11 | 1 |
| 21 | C1 | 0 |
| 22 | C2 | 0 |
| 23 | C3 | 0.1 |
| 24 | C3 | 0.2 |
| 25 | C3 | 0.3 |
| 26 | C4 | 0.5 |

Some of the test blocks were immersed in water after an initial period of setting under ambient conditions (given in Table 3 as time A). The immersion period is given as time B, and varied from 15 minutes to 24 hours. The amount of water absorbed was measured by weighing the test block after the immersion period and subtracting the weight before the immersion period. Details are given in Table 3 below.

TABLE 3

| Test Block | Time A | Time B | Water absorbed |
|---|---|---|---|
| 1 | 10 days | 2 hours | 9 g |
| 1 | 17 days | 2 hours | 10 g |
| 1 | 31 days | 2 hours | 10 g |
| 7 | 7 days | 24 hours | 9.5 g |
| 8 | 7 days | 2 hours | 6 g |
| 9 | 7 days | 2 hours | 8 g |
| 10 | 7 days | 2 hours | 9 g |
| 11 | 7 days | 2 hours | 3 g |
| 12 | 7 days | 2 hours | 34 |
| 17 | 7 days | 24 hours | 7.6 |
| 21 | 10 days | 2 hours | 40 |
| 21 | 7 days | 24 hours | 33.4 |
| 22 | 7 days | 24 hours | 38.2 |
| 25 | 7 days | 24 hours | 43.8 |
| 26 | 7 days | 15 minutes | 43 |
| 26 | 14 days | 15 minutes | 45.5 |
| 26 | 28 days | 15 minutes | 48.5 |
| 26 | 7 days | 2 hours | 57.5 |
| 26 | 14 days | 2 hours | 62 |
| 26 | 28 days | 2 hours | 63.5 |

Some of test blocks were also subjected to repeated wetting. here the first wetting took place after time A, the repeat wetting took place 7 days after the first wetting. having allowed the block to dry at ambient temperature. These repeat wettings are given as R1, R2 and R3 for first, second and third repeat respectively. Blocks were immersed in water for different times (time B) as given in Table 4 below.

TABLE 4

| Test Block | Time A | Time B | Repeat | Water absorbed |
|---|---|---|---|---|
| 2 | 7 days | 15 minutes |  | 18.1 g |
| 2 | 7 days | 15 minutes | R1 | 4.2 g |
| 2 | 7 days | 15 minutes | R2 | 6.1 g |
| 2 | 7 days | 15 minutes | R3 | 4.5 g |
| 2 | 7 days | 2 hours |  | 31.4 g |
| 2 | 7 days | 2 hours | R1 | 14 g |
| 2 | 7 days | 2 hours | R2 | 17.3 g |
| 2 | 7 days | 2 hours | R3 | 12.8 g |

TABLE 4-continued

| Test Block | Time A | Time B | Repeat | Water absorbed |
|---|---|---|---|---|
| 3 | 7 days | 15 minutes |  | 12.3 g |
| 3 | 7 days | 15 minutes | R1 | 1.7 g |
| 3 | 7 days | 15 minutes | R2 | 2.2 g |
| 3 | 7 days | 15 minutes | R3 | 2.1 g |
| 3 | 7 days | 2 hours |  | 23.5 g |
| 3 | 7 days | 2 hours | R1 | 5.1 g |
| 3 | 7 days | 2 hours | R2 | 8.1 g |
| 3 | 7 days | 2 hours | R3 | 5.3 g |
| 4 | 7 days | 15 minutes |  | 9.3 g |
| 4 | 7 days | 15 minutes | R1 | 3 g |
| 4 | 7 days | 15 minutes | R2 | 2 g |
| 4 | 7 days | 15 minutes | R3 | 2.4 g |
| 4 | 7 days | 2 hours |  | 15.8 g |
| 4 | 7 days | 2 hours | R1 | 8.8 g |
| 4 | 7 days | 2 hours | R2 | 3.5 g |
| 4 | 7 days | 2 hours | R3 | 3.7 g |
| 4 | 14 days | 15 minutes |  | 5 g |
| 4 | 14 days | 15 minutes | R1 | 2.4 g |
| 4 | 14 days | 15 minutes | R2 | 2.4 g |
| 4 | 14 days | 2 hours |  | 12.4 g |
| 4 | 14 days | 2 hours | R1 | 2.9 g |
| 4 | 14 days | 2 hours | R2 | 3.4 g |
| 4 | 28 days | 15 minutes |  | 4.8 g |
| 4 | 28 days | 2 hours |  | 9.6 g |
| 5 | 7 days | 15 minutes |  | 12 g |
| 5 | 7 days | 15 minutes | R1 | 3.1 g |
| 5 | 7 days | 15 minutes | R2 | 2.6 g |
| 5 | 7 days | 15 minutes | R3 | 1.4 g |
| 6 | 7 days | 15 minutes |  | 2.2 g |
| 6 | 7 days | 15 minutes | R1 | 2.3 g |
| 6 | 7 days | 15 minutes | R2 | 2.4 g |
| 6 | 7 days | 15 minutes | R3 | 1.6 g |
| 7 | 7 days | 2 hours |  | 20.3 g |
| 7 | 7 days | 2 hours | R1 | 11.1 g |
| 7 | 7 days | 2 hours | R2 | 5.2 g |
| 7 | 7 days | 2 hours | R3 | 2.1 g |
| 7 | 14 days | 2 hours |  | 17.3 g |
| 7 | 14 days | 2 hours | R1 | 9.8 g |
| 7 | 14 days | 2 hours | R2 | 3.1 g |
| 7 | 21 days | 2 hours |  | 12.3 g |
| 7 | 21 days | 2 hours | R1 | 2.9 g |
| 7 | 28 days | 2 hours |  | 13.5 g |
| 12 | 7 days | 2 hours |  | 34.6 g |
| 12 | 7 days | 2 hours | R1 | 22.5 g |
| 12 | 7 days | 2 hours | R2 | 14.5 g |
| 12 | 7 days | 2 hours | R3 | 11.1 g |
| 12 | 14 days | 2 hours |  | 29.3 g |
| 12 | 14 days | 2 hours | R1 | 15.1 g |
| 12 | 14 days | 2 hours | R2 | 12.9 g |
| 12 | 21 days | 2 hours |  | 31.8 g |
| 12 | 21 days | 2 hours | R1 | 17.7 g |
| 12 | 28 days | 2 hours |  | 32.1 g |
| 15 | 7 days | 2 hours |  | 13.4 g |
| 15 | 7 days | 2 hours | R1 | 7 g |
| 15 | 7 days | 2 hours | R2 | 8.6 g |
| 15 | 7 days | 2 hours | R3 | 10.8 g |
| 15 | 14 days | 2 hours |  | 9.6 g |
| 15 | 14 days | 2 hours | R1 | 3.6 g |
| 15 | 21 days | 2 hours |  | 13.8 g |
| 15 | 21 days | 2 hours | R1 | 12.1 g |
| 17 | 7 days | 2 hours |  | 10.8 g |
| 17 | 7 days | 2 hours | R1 | 3.4 g |
| 17 | 7 days | 2 hours | R2 | 2.7 g |
| 17 | 7 days | 2 hours | R3 | 3.1 g |
| 17 | 14 days | 2 hours |  | 8.4 g |
| 17 | 14 days | 2 hours | R1 | 4.1 g |
| 17 | 14 days | 2 hours | R2 | 3.7 g |
| 17 | 21 days | 2 hours |  | 4.7 g |
| 17 | 21 days | 2 hours | R1 | 3.5 g |
| 17 | 28 days | 2 hours |  | 8.5 g |
| 20 | 7 days | 2 hours |  | 11.6 g |
| 20 | 7 days | 2 hours | R1 | 3 g |
| 20 | 7 days | 2 hours | R2 | 2.9 g |
| 20 | 7 days | 2 hours | R3 | 2.8 g |
| 20 | 14 days | 2 hours |  | 5.6 g |
| 20 | 14 days | 2 hours | R1 | 3.6 g |
| 20 | 14 days | 2 hours | R2 | 2.8 g |

TABLE 4-continued

| Test Block | Time A  | Time B  | Repeat | Water absorbed |
|------------|---------|---------|--------|----------------|
| 20         | 21 days | 2 hours |        | 7.6 g          |
| 20         | 21 days | 2 hours | R1     | 5.1 g          |
| 20         | 28 days | 2 hours |        | 12.9 g         |
| 24         | 7 days  | 2 hours |        | 11.6 g         |
| 24         | 7 days  | 2 hours | R1     | 19.7 g         |
| 24         | 7 days  | 2 hours | R2     | 17.4 g         |
| 24         | 7 days  | 2 hours | R3     | 17.5 g         |
| 24         | 14 days | 2 hours |        | 9.4 g          |
| 24         | 14 days | 2 hours | R1     | 9.5 g          |
| 24         | 14 days | 2 hours | R2     | 10.2 g         |
| 24         | 21 days | 2 hours |        | 14.2 g         |
| 24         | 21 days | 2 hours | R1     | 12.4 g         |
| 24         | 28 days | 2 hours |        | 12 g           |

It is clear from the test results that by allowing the cement to set for a longer period of time before initial testing, the hydrophobicity has further developed as less water is being absorbed. Even more remarkably is that upon re-wetting the amount of water which is absorbed is reduced in subsequent re-wettings until a more or less constant level has been reached.

That which is claimed is:

1. A cementitious material comprising in powder form, dry cement, and an effective amount of a pre-granulated hydrophobing additive, which comprises based upon 65 to 135 parts by weight from 5 to 15 parts by weight of an organopolysiloxane component, from 10 to 40 parts by weight of a binder selected from the group consisting of water-soluble and water-dispersible binders, and from 50 to 80 parts by weight of a carrier particle, to give from 0.01 to 5% by weight of the organopolysiloxane component based on the weight of the dry cement.

2. A cementitious material according to claim 1, wherein the organopolysiloxane component of the hydrophobing additive comprises a majority of di-functional siloxane units having the general formula $R_2SiO_{2/2}$, wherein each R is independently selected from the group consisting of organic components, hydroxyl and halogen-substituents and wherein siloxane units selected from the group consisting of tri-functional and tetra-functional siloxane units are present in an amount which does not exceed 10% of the total number of siloxane units.

3. A cementitious material according to claim 1, wherein the organopolysiloxane component of the hydrophobing additive has a viscosity of from 50 to 60,000 mm$^2$/s at 25° C.

4. A cementitious material according to claim 1 wherein the organopolysiloxane component of the hydrophobing additive has the general formula

wherein each R is independently selected from the group consisting of organic components, hydroxyl and halogen-substituents, each R' is independently selected from the group consisting of hydrocarbon groups and substituted hydrocarbon groups, R" is an organopolysiloxane chain of the formula —O—[R'$_2$SiO]$_x$—SiR'$_2$R, a is an integer, b, c and x are zero or integers, the value of b+c not being greater than 5% of the total value of a+b+c+x.

5. A cementitious material according to claim 1 wherein the binder material of the hydrophobing additive has at 20° to 25° C., a consistency which is waxy, highly viscous or solid, said binder material having a melting point of from 25° to 1500° C.

6. A cementitious material according to claim 1 wherein the binder material of the hydrophobing additive is water-soluble.

7. A cementitious material according to claim 1 wherein the carrier particle of the hydrophobing additive is selected from the group consisting of starch, methyl cellulose, carboxy methyl cellulose, cement, silica, alumino silicates, clay materials, lime, calcium carbonates, polystyrene beads and polyacrylate beads, said carrier particle having a diameter of from 10 to 5000 μm.

8. A cementitious material according to claim 1 wherein the granulated hydrophobing additive comprises from 10 to 15% by weight of the organopolysiloxane component, from 15 to 30% by weight of the binder and from 55 to 75% by weight of the carrier.

9. A cementitious material according to claim 1 wherein the organopolysiloxane and binder components together comprise from 20 to 45% by weight of the total weight of the hydrophobing additive, wherein the weight ratio of carrier particles to the combined weight of binder and organopolysiloxane components is in the range from 3/2 to 9/1 and wherein the weight ratio of binder component to organopolysiloxane component is greater than 1/1.

10. A method of hydrophobing cement comprising forming a powder by mixing into dry cement, a pre-granulated hydrophobing additive consisting essentially of from 5–15 parts by weight of an organopolysiloxane component, from 10–40 parts by weight of a binder selected from the group consisting of water-soluble and water-dispersible binders, and from 50–80 parts by weight of a carrier particle, to provide from 0.01–5% by weight of the organopolysiloxane component based on the weight of the dry cement.

11. A cementitious material comprising in powder form, dry cement, and an effective amount of a pre-granulated hydrophobing additive, the pre-granulated hydrophobing additive consisting essentially of from 5 to 15 parts by weight of an organopolysiloxane component, from 10 to 40 parts by weight of a binder selected from the group consisting of water-soluble and water-dispersible binders, and from 50 to 80 parts by weight of carrier particles, to give from 0.01 to 5% by weight of the organopolysiloxane component based on the weight of the dry cement.

12. A cementitious material comprising in dry powder form, dry cement, and an effective amount of a pre-granulated hydrophobing additive, the pre-granulated hydrophobing additive consisting essentially of from 5 to 15 parts by weight of an organopolysiloxane component, from 10 to 40 parts by weight of a binder selected from the group consisting of water-soluble and water-dispersible binders, and from 50 to 80 parts by weight of carrier particles, to give from 0.01 to 5% by weight of the organopolysiloxane component based on the weight of the dry cement; the pre-granulated hydrophobing additive being prepared by (i) depositing the organopolysiloxane component and the binder in liquid form onto the carrier particles, and (ii) forming a dry free flowing solid powder by cooling or evaporation.

13. A cementitious material according to claim 12 wherein the binder is a polyoxyethylene wax.

14. A cementitious material according to claim 12 wherein the carrier particles are starch, methyl cellulose, carboxy methyl cellulose, silica, alumino silicates, clay, lime, calcium carbonate, polystyrene beads, or polyacrylate beads.

* * * * *